United States Patent [19]
Cheng

[11] Patent Number: 5,381,290

[45] Date of Patent: Jan. 10, 1995

[54] BI-STABLE MECHANICAL LATCH FOR DISK DRIVE ACTUATOR

[75] Inventor: Chunjer C. Cheng, Saratoga, Calif.

[73] Assignee: Ministor Peripherals International Limited, San Jose, Calif.

[21] Appl. No.: 922,040

[22] Filed: Mar. 3, 1992

[51] Int. Cl.⁶ ............................................. G11B 5/54
[52] U.S. Cl. .................................................. 360/105
[58] Field of Search ........................ 360/105, 106, 109

[56] References Cited

U.S. PATENT DOCUMENTS

| | | | |
|---|---|---|---|
| 4,716,480 | 12/1987 | Wiens et al. | 360/105 |
| 4,725,907 | 2/1988 | Jue | 360/105 |
| 4,881,139 | 11/1989 | Hazebrouck | 360/105 |
| 4,989,108 | 1/1991 | Chang | 360/105 |
| 5,162,959 | 11/1992 | Arin et al. | 360/105 |
| 5,208,713 | 5/1993 | Lindsay et al. | 360/105 |
| 5,216,662 | 6/1993 | Stefansky et al. | 369/215 |
| 5,231,556 | 7/1993 | Blanks | 360/105 |

*Primary Examiner*—John H. Wolff
*Attorney, Agent, or Firm*—D'Alessandro, Frazzini & Ritchie

[57] ABSTRACT

A static bi-stable mechanical latch comprises a latch member pivotally mounted to a frame and rotatable between an opened-position stop and a closed-position stop. The latch member includes a first arm having a hooked end and a magnetic mass mounted thereon, and a second arm having a latch coil and a soft magnetic mass mounted thereon. The second arm is also provided with a tang or bump. The actuator is provided with an angular protuberance and a tip which is captured by the hooked end of the latch member when the actuator arm is positioned so that the head is in the landing zone and the latch member is in the closed position. The pivot point of the latch member is positioned so the angular protuberance of the actuator arm engages the tang or bump when the actuator is moving towards the landing zone and is in a preselected position close to or in the landing zone. A magnet assembly comprising at least one mounted permanent magnet is positioned with respect to the actuator coil so as to allow control of the actuator position by controlling electric current passing through the actuator coil and with respect to the latch coil so as to apply a torque to rotate the latch member by passing current through the latch coil. The magnet assembly is configured and positioned such that its magnetic field force attracts both magnetic masses. Depending on the rotational position of the latch member, one force prevails over the other.

5 Claims, 3 Drawing Sheets

BI-STABLE MECHANICAL LATCH FOR DISK DRIVE ACTUATOR

BACKGROUND OF THE INVENTION

1. Field of the Invention

The present invention relates to disk drives for computers. More particularly, the present invention relates to apparatus for mechanically latching or "parking" the actuator.

2. The Prior Art

Most disk drives are equipped with some type of arrangement which provides for securing or "parking" the head actuators so that the heads may be held immobilized over a landing zone on a disk at times when the drive is not in use, such as during transportation of the disk drive or the computer in which it is installed. These mechanical latching devices typically comprise either magnetic or mechanical, or a combination of magnetic and mechanical latching means.

Historically, disk drives started as very large immovable devices, weighing over 2000 pounds, and having disk diameters ranging from 2 to 4 feet. Disk sizes have quickly evolved to 14 inches, 5.25 inches, 3.5, inches, 2.5 inches and smaller. As development continues, disk drives are continually shrinking in size to accommodate new applications.

As disk diameters, and hence the drives which contain them become smaller, different issues arise in the design of actuator "parking" mechanisms. As continuing evolution shrinks disk diameters below two inches, mechanical shock becomes an increasingly larger concern in the design of head parking mechanisms. Larger disk drives (i.e., 5.25 inch and 3.5 inch) are generally mounted into computer systems housed in larger cases, usually residing on desk tops, or in even larger "tower" cases which are placed on the floor. In these environments, design of actuator latches for larger disk drives, even the 5.25 inch and 3.5 inch drives, are relatively free from constraints relating to mechanical shocks because the likely-to-be-encountered mechanical shock forces are small compared to the force with which a latch can hold the actuator arm. In addition, because such devices are powered from power supplies connected to electrical utility distribution systems, power consumption is not an issue and can be continuously supplied to a disk drive latching mechanism when desired. The absence of power and space constraints gives the mechanical designer a wide range of options when designing a latching mechanism.

The present concern over mechanical shock as an issue in the design of latching mechanisms results from the development of the small disk drives which are designed to reside in small "laptop" and "notebook" computers and the problems which are presented to designers because of size and other requirements. Such applications present an environment in which bumping and jostling is much more likely. A lap-top computer system weighs from about 5 to 15 pounds. This lower weight increases the likely-to-be-encountered mechanical shock forces which have to be taken into consideration. Such forces are significantly larger than those likely to be encountered in larger disk drives in comparison to the force that an actuator is capable of generating. This means that the ideal latching mechanism has to provide enough latching force to keep the actuator in the desired landing zone position during parking. However, due to the smaller size of the drives, this requirement competes with the requirement that the force necessary to free the actuator from its parked position be reasonably provideable in the small disk drive.

In addition, the applications for which the smaller disk drive units are being considered are largely notebook, lap-top, and palm-top computer applications. Since these smaller computers are designed to be portable and are thus powered for the most part by batteries, power-management considerations require that the disk drives be operable with a minimum amount of power. Furthermore, most such applications require extremely low standby-power requirements for the disk drives when they are not being written to or read from. This power-management requirement restricts latching designs to static embodiments which do not continuously consume power.

Finally, as disk drive sizes continue to shrink, the amount of data area available on the disk decreases. It is thus desirable to maximize the free movement of the actuator to maximize the data area without having to sacrifice movement, and hence useable disk data area, to accommodate the latching mechanism.

These considerations present a significant challenge to the disk drive designer. There is a need for providing a reliable actuator latching mechanism which is adaptable to the several design requirements of small disk drives.

BRIEF DESCRIPTION OF THE INVENTION

According to a presently preferred embodiment of the invention, a static bi-stable mechanical latch for a disk drive actuator arm comprises a latch member pivotally mounted to a disk drive frame. The latch member includes a first arm and a second arm radially extending from its pivot point. As will be more fully described later herein, rotation of the latch member about the pivot point is mechanically confined between two fixed positions, an open position and a closed position.

The first arm includes a hooked end oriented with the open hook facing the actuator and a soft (i.e., attracted to magnets) magnetic material, such as an iron mass preferably in the form of a small steel ball. The second arm includes a latch coil or magnet mounted thereon, and/or a soft magnetic mass such as a small steel ball. The second arm of the latch member is also provided with a laterally-protruding tang or bump. The mass of the latch member is preferably distributed such that the center of mass is at its pivot point and the angular mass moments on each side of the pivot point are thus canceled.

An actuator to be parked using the apparatus of the present invention comprises an arm with data heads affixed to a first end thereof. The actuator arm is pivotally mounted at a position which allows the head to be positioned anywhere in either a data zone or landing zone of a magnetic disk. A second end of the actuator is provided with a tip which nests into the hooked end of the latch member when the actuator is positioned such that the head is over the landing zone of the disk. The actuator is also provided with an angular protuberance which is positioned to engage the tang or bump on the second arm of the latch member when the actuator arm is moving towards the landing zone and is in a position close to or in the landing zone. The actuator includes a coil used by the servo system of the drive to position the actuator in any angular position commanded.

The actuator coil is positioned with respect to a magnet assembly so as to allow control of the actuator position by controlling electric current passing through the actuator coil. The magnet assembly is configured and positioned such that its magnetic field force attracts the magnetic mass on the first arm of the latch member, applying a clockwise rotational force to the latch member, and attracts the magnetic mass on the second arm of the latch member, applying a counter-clockwise rotational force to the latch member.

When the power is cut to the spindle motor, the circuitry in the disk drive is activated to apply the back EMF generated by the still-rotating spindle motor to the actuator coil. The magnetic field produced around the actuator coil from the coil current resulting from the back EMF applies a torque to the actuator which rotates it in a direction such that the head moves towards the landing zone and the tip moves towards the hooked end of the latching member. When the angular protuberance on the actuator contacts the tang or bump, the actuator takes the latch member along and rotates the hooked end of the latch member towards the tip of the actuator, thus nesting the tip in the hook and locking the actuator in the parked position. The magnetic attraction between the magnetic mass on the first arm of the latch member and the magnet assembly keeps the latch member in the closed position. The combination of the tang or bump and the hook on the latch member and the protuberance on the actuator arm keeps the tip positively nested in the lock.

In order to release the latch when it is desired to activate the drive and unpark the actuator, a current is passed through the actuator coil to move the tip counter-clockwise away from the hook, then a momentary current is passed through the latch coil. The magnetic field generated by the latch coil current creates a magnetic attractive force between the latch coil and the magnet assembly. This force applies a rotational force to the latch member which rotates its first arm away from the actuator to release the actuator tip from its hooked end. At this moment, the polarity of the current passed through the actuator coil is reversed to rotate the actuator arm into a position over the data zone of a data disk. As the latch member and actuator rotate, the magnetic mass on the second arm of the latch member moves towards the magnet assembly and the magnetic attraction between the magnetic mass on the second arm and the magnet assembly keeps the latch member in the open position after the power applied to the latch coil is turned off.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
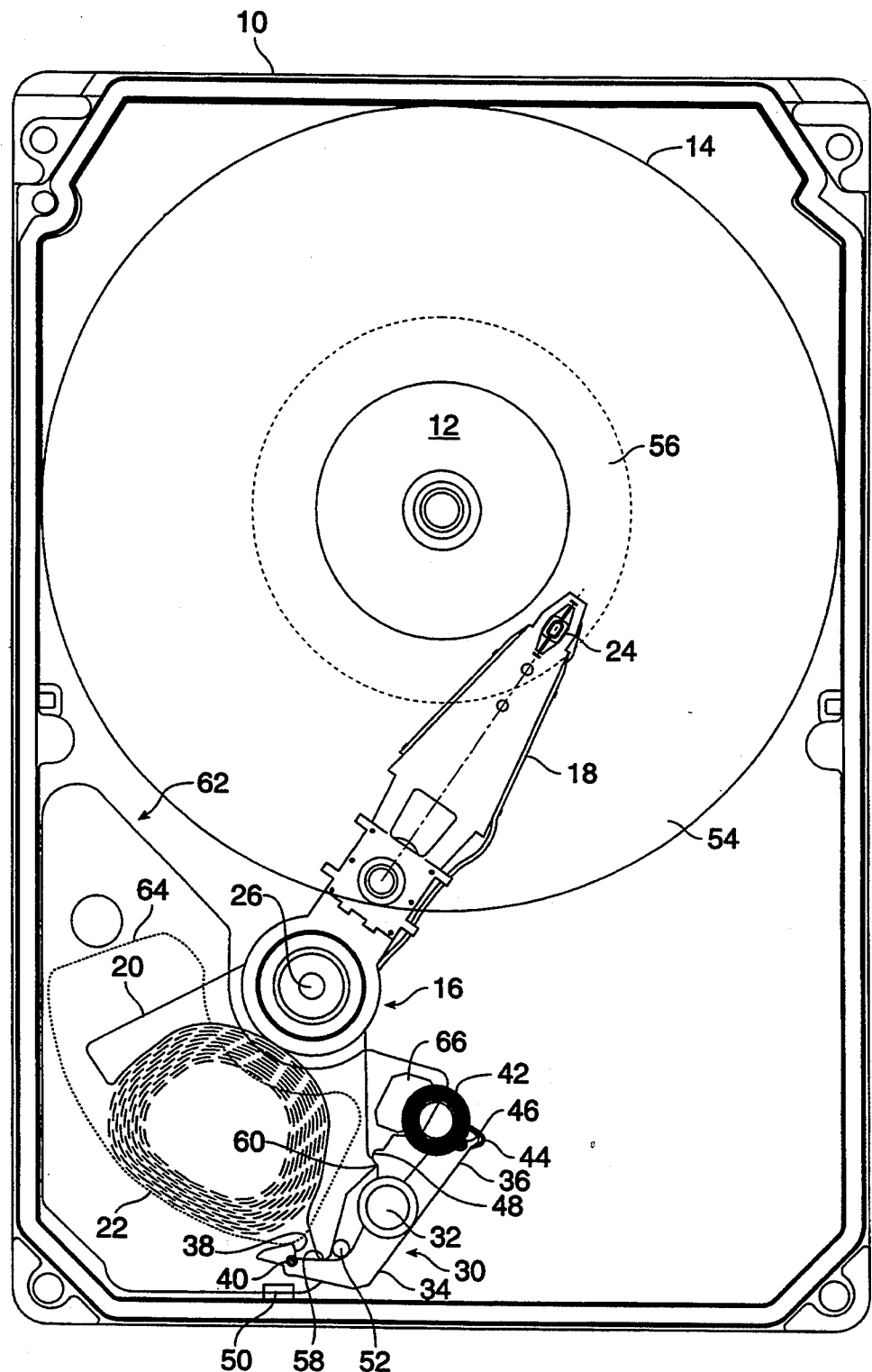
FIG. 1 is a top view of a disk drive mechanism including a bistable mechanical latch according to a presently preferred embodiment of the invention.
Figure 2B:
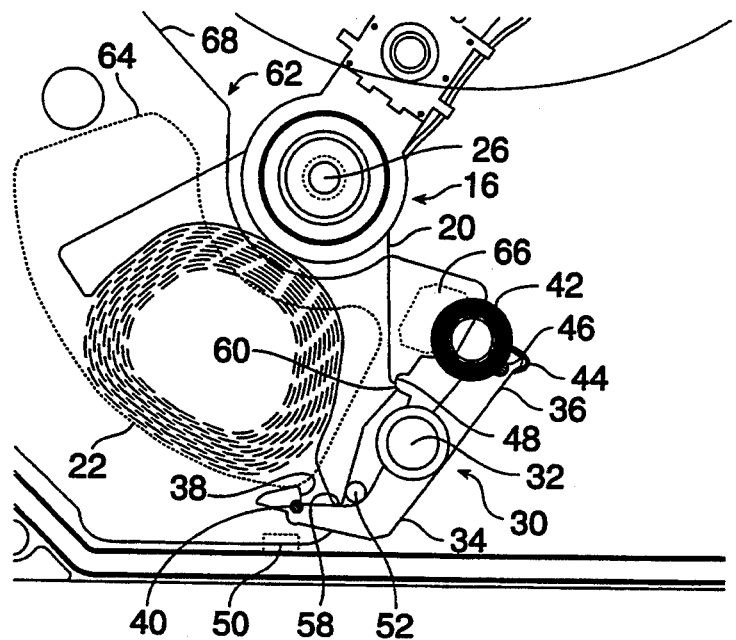
FIG. 2b is a magnified portion of the disk drive mechanism of FIG. 1, showing the actuator arm in the parked position and the latch member in the closed position.
Figure 2A:
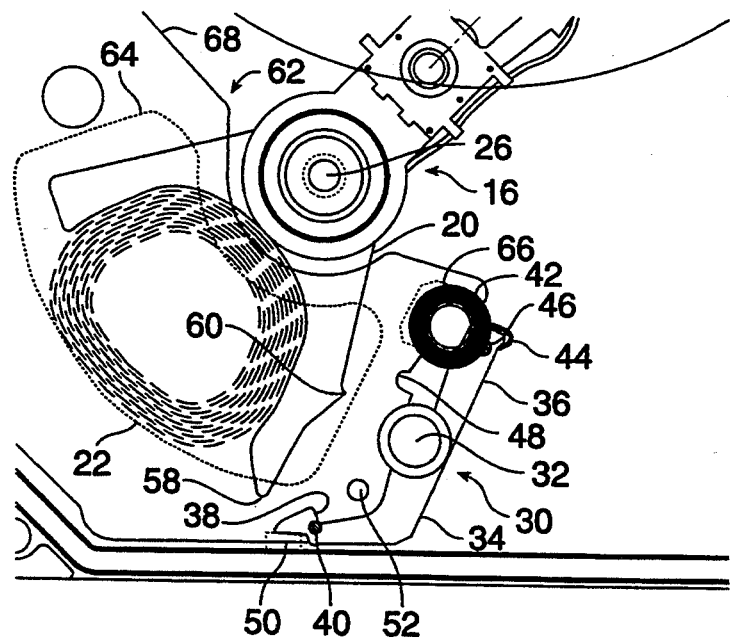
FIG. 2a is a magnified portion of the disk drive mechanism of FIG. 1, showing the actuator arm in the free position and the latch member in the open position.
Figure 3A:
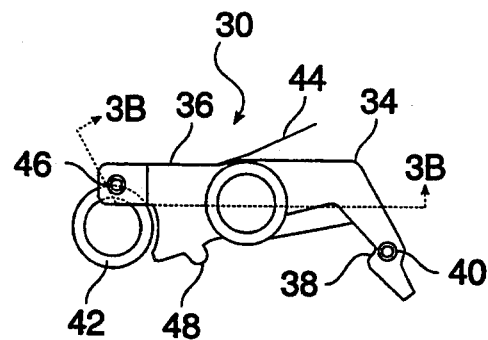
FIG. 3a is a top view of a presently preferred pivoting latch arm for use in the bi-stable latch apparatus of FIG. 1.
Figure 3B:
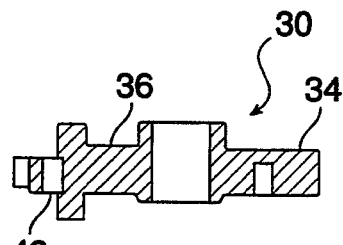
FIG. 3b is a cross-sectional view of the pivoting latch arm of FIG. 3a, taken through lines 3b—3b.

Referring first to FIGS. 1, 2a and 2b, a top view of a disk drive including the apparatus of the present invention is shown (FIG. 1) and magnified top views of the portion of the disk drive of FIG. 1 are shown in FIGS. 2a and 2b. The disk drive is disposed upon a disk drive frame 10, on which is mounted spindle motor 12 carrying disk 14, and actuator 16 with first and second actuator arms 18 and 20, actuator coil 22 and data head 24. Actuator 16 is pivotally mounted to frame 10 at actuator pivot point 26.

As shown in FIGS. 1, 2a and 2b, according to a presently preferred embodiment of the invention, a static bi-stable mechanical latch for disk drive actuator 16 comprises a latch member 30 pivotally mounted to frame 10 at latch-member pivot point 32. As may be easily seen from FIGS. 2a, 2b, 3a, and 3b, latch member 30 includes a first arm 34 and second arm 36 radially extending from its pivot point 32. First arm 34 is equipped with a hook 38 oriented such that the open hook faces the end of the second actuator arm 20 opposite the head-carrying end. First arm 34 also includes a first magnetic mass 40, preferably in the form of a steel ball.

Second arm 36 includes a latch coil 42 mounted thereon, preferably at or near the end furthest from the pivot point 32. A pair of electrical leads 44 are used to provide current to the latch coil 42. Second arm 36 also includes a second magnetic mass 46, preferably in the form of a steel ball. Second arm 36 is also provided with a tang or bump 48 extending laterally in a direction towards second actuator arm 20. An open-position stop 50 and a closed-position stop 52 are mounted on disk drive frame 10 at selected positions in the path of first arm 34. The positions of open-position stop 50 and a closed-position stop 52 are chosen to restrict the rotational motion of latch member 30 as will be more fully explained herein.

The mass of latch member 30 is preferably distributed equally over first arm 34 and second arm 36 such that the center of mass is at its pivot point 32 to cancel the angular moments on each side of the pivot point 32. The only force which thus appreciably affects latch member 30 is the rotational force applied by the co-operating elements of the present invention, or unintended external shock, vibration, or rotational shock load.

Actuator 16 for use with the apparatus of the present invention comprises a pivotally mounted first actuator arm 18 with data heads 24 affixed to one end thereof. Actuator pivot point 26 allows data heads 24 to be positioned anywhere in either the data zone 54 or landing zone 56 of disk 14 (FIG. 1). Actuator 16 is provided with a tip 58, preferably located at the end thereof opposite to the end upon which data heads 24 are mounted. Tip 58 is shaped to nest into hooked end 38 of latch member 30 when actuator 16 is positioned such that data heads 24 are located over landing zone 56 of disk 14. FIG. 2a shows actuator 16 in the free position, and FIG. 2b shows actuator 16 in the latched position with its tip 58 nested into hooked end or hook 38 of latch member 30.

Actuator coil 22 is mounted at the end opposite to data heads 24. Actuator coil 22 is driven in a well-known manner by the servo electronics of the disk drive to move actuator 16 such that data heads 24 are positioned over a desired radial position of disk 14.

Latch member pivot point 32 is positioned with respect to actuator pivot point 26 so that tang or bump 48 is contacted by an angular protuberance 60 located on second actuator arm 20 when it is moving towards a rest position over landing zone 56. When contact is made, a torque is applied to latch member 30 to rotate it (clockwise in FIG. 1) to a position where hooked end 38 engages tip 58 of actuator 16.

Figure 4A:
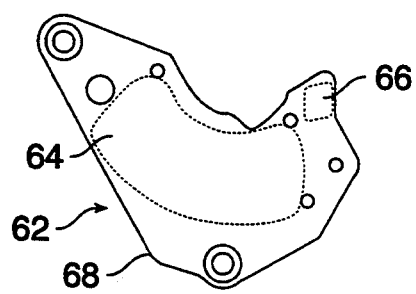
FIG. 4a is a top view of a presently preferred cover plate and magnet assembly for use in the bi-stable latch apparatus of FIG. 1.
Figure 4B:
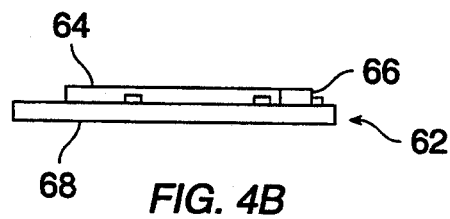
FIG. 4b is a side view of a presently preferred cover plate and magnet assembly for use in the bi-stable latch apparatus of FIG. 1.

A magnet assembly 62 is positioned near actuator coil 22, latch coil 42, and first and second magnetic masses 40 and 46. According to a presently preferred embodiment, which may be seen in phantom lines in FIGS. 2a and 2b, and in top and side views in FIGS. 4a and 4b, magnet assembly 62 comprises first and second permanent magnets 64 and 66 mounted to mounting plate 68. Magnet assembly 62 is positioned at a location over actuator coil 62 so that first permanent magnet 64 and actuator coil 22 can control of the position of actuator 16 by controlling electric current passing through actuator coil 22 to apply a torque to actuator 16. Magnet assembly 62 is positioned such that the magnetic attraction between first permanent magnet 64 and first magnetic mass 40 on first arm 34 of latch member 30 applies a rotational force to latching member 30 in a first direction (clockwise in FIGS. 1, 2a, and 2b) towards tip 58 on actuator 16. Second permanent magnet 66 is positioned such that magnetic attraction between it and latch coil 42 (when selectively energized) and second magnetic mass 46 applies a rotational force to latch member 30, opposite to the rotational force exerted by the magnetic attractive force between first magnetic mass 40 and first magnetic magnet 64, which tends to rotate first arm 34 of latch member 30 in a second direction (counterclockwise in FIGS. 1, 2a, and 2b) away from actuator 16.

Because the forces of magnetic attraction between the magnet assembly 62 and the first and second magnetic masses 40 and 46 on the first and second arms 34, 36 of latch member 30 vary inversely with the square of the distance between the two magnetic bodies, the magnetic attraction between magnet assembly 62 and first and second magnetic masses 40, 46 disposed on first and second arms 34, 36 of latch member 30 is such that a static bi-stable system is created. The effect of the magnetic forces can be analogized to the effects of the force of gravity acting on a ball poised at the top of a hill. As long as it is positioned at the crest of the hill its position will remain stable. If, however, it is positioned slightly to either side of the crest of the hill, gravity will cause it to roll down that side.

The size of first and second magnetic masses 40 and 46, the relative positions of the permanent magnet assembly 62, and latch coil core 42, and the strength of first and second permanent magnets 64 and 66 in magnet assembly 62, are chosen such that, the rotational force exerted by the magnetic force of attraction between second permanent magnet 66 and latch 42 when the coil is energized exceeds the rotational force exerted by the magnetic attraction between first magnetic mass 40 and first permanent magnet 64. The result is that latch member 30 is rotated from the closed position to the open position and remains at rest in a position out of the arc of movement of actuator tip 58 when data heads 24 is positioned over data zone 54 of disk 14. When latch coil 42 is not energized, latch member 30 is statically kept at either its open or closed position.

In an illustrative embodiment of the present invention, latch coil 42 may comprise about 240 turns of #46 AWG wire wound to an outside radius of about 0.14", an inside radius of about 0.10", and a height of about 0.053". Magnet assembly 62 may include NdBFe rare-earth permanent magnets having a strength of about 32 MGOe, such as grade NA32B available from Ugimag of Valpariaso, Ind.

The latch apparatus of the present invention is activated when the power is cut to spindle motor 12 via the following described action. Switching circuitry in the disk drive is activated to apply the back EMF generated by the still-rotating spindle motor 12 to actuator coil 22. The interaction between the magnetic field produced around actuator coil 22 from the coil current resulted from the back EMF and magnet assembly 62 applies a torque to actuator 16 which rotates it in a direction such that data heads 24 move towards a position over landing zone 56 of disk 14. As actuator 16 moves in this direction, tip 58 moves towards hooked end 38 of latch member 30. During its travel, angular protuberance 60 of the second actuator arm 20 of actuator 16 contacts tang or bump 48 of latch member 30 and takes along the second arm 36 of latch member 30 and rotates hooked end 38 of latch member 30 to a position where it receives tip 58 of actuator 16, thus locking actuator 16 in the parked position. In this position, first magnetic mass 40 is positioned closer to magnet assembly 62 than second magnetic mass 46 and the clockwise rotational force caused by the magnetic attractive force between the first magnetic mass and magnet assembly 62 holds first arm 34 of latch member 30 against closed-position stop 52 located at a position on disk drive frame 10 which assures that tip 58 of actuator 16 remains captured by hooked end 38 of latch member 30.

In order to release tip 58 of actuator 16 from hooked end 38 of latch member 30 when it is desired to activate the disk drive and unpark actuator 16, a current is passed through actuator coil 22 which applies a counter-clockwise torque to rotate tip 58 away from hook 38. Then, a momentary current is passed through latch coil 42. The magnetic field generated by the latch coil current creates a magnetic attractive force between latch coil 42 and magnet assembly 62. This force applies a counterclockwise rotational force to latch member 30 which overcomes the attractive force between magnet assembly 62 and first magnetic mass 40, thus rotating first arm 34 away from actuator tip 58 to position hook 38 out of the arc of movement of actuator tip 58. As second magnetic mass 46 moves closer to magnet assembly 62, first magnetic mass 40 moves away from magnet assembly 62. The counterclockwise rotational force caused by the magnetic attractive force between second magnetic mass 46 and magnet assembly 62 holds first arm 34 of latch member 30 to open-position stop 50. Open-position stop 50 is located at a position on disk drive frame 10 which assures that tip 58 of actuator 16 is free of hook 38 of latch member 30.

Those of ordinary skill in the art will recognize that the latching apparatus according to the present invention relies on static magnetic forces during operation of the disk drive. Spring forces may be used to substitute for these forces. The only power supply current consumed during operation of the latch is that used to momentarily energize latch coil 42 when it is desired to unpark the actuator.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a disk drive mechanism including an actuator mounted at a first pivot point, said actuator including a first radially-extending arm including a data head mounted thereon and a second radially-extending arm having an actuator coil mounted thereon, said first pivot point positioned with respect to a data disk so that said data head may be positioned over a data zone and a landing zone on said data disk, a static bi-stable mechanical disk drive actuator latch comprising:

a latch member mounted at a second pivot point, said latch member rotatable between an open position defined by an opened-position stop and a closed position defined by a closed-position stop, said latch member including first and second arms radially extending from said pivot point, said first arm including a hook located proximate to a distal end thereof and having a first magnetic mass mounted thereon, said second arm including a latch coil and a second magnetic mass mounted thereon, and having a tang extending in a direction generally towards said actuator;

said second radially extending arm of said actuator including a protuberance extending in a direction generally towards said tang, and a tip nestable in said hook;

said first and second pivot points positioned with respect to one another such that said tang will engage said protuberance at a predetermined position when said actuator is rotating so as to place said data head over said landing zone and such that said tip will be captured by said hook when said actuator is positioned such that said data head is over said landing zone and said latch member is in said closed position; and a magnet positioned proximately to said actuator coil, said latch coil, and said first and second magnetic masses;

wherein said magnet has a field strength selected such that, said magnet is positioned such that, and said first and second magnetic masses are sized such that, the rotational position of said actuator may be controlled by passing electric current through said actuator coil, a magnetic force of attraction between said magnet and said first magnetic mass will hold said latch member at said closed position, passing an electric current through said latch coil will move said latch member to said open position, and a magnetic force of attraction between said magnet and said second magnetic mass will hold said latch member at said open position after the electric current is turned off.

2. In a disk drive mechanism including an actuator mounted at a first pivot point, said actuator including a first radially-extending arm including at least one data head mounted thereon and a second radially-extending arm having an actuator coil mounted thereon, said first pivot point positioned with respect to a data disk so that said data head may be positioned over a data zone and a landing zone on said data disk by passing electrical current through said actuator coil, apparatus for latching said disk drive actuator, comprising:

bi-stable mechanical latch means for latching said disk drive actuator, said bi-stable mechanical latch means having a first unlatched state in which said actuator is free to move over said data zone, and a second latched state in which said actuator is confined over said landing zone, said bi-stable mechanical latch means including force-balancing means for statically maintaining said bi-stable mechanical latch means in either one of said first and second states without application of electric current;

unpowered latching means, magnetically responsive to said at least one data head being positioned over said landing zone, for switching said bi-stable mechanical latch means from said first unlatched state into said second latched state; and releasing means, responsive to an electrical release signal, for switching said bi-stable mechanical latch means from said second latched state into said first unlatched state.

3. In a disk drive mechanism including an actuator mounted at a first pivot point, said actuator including a first radially-extending arm including at least one data head mounted thereon and a second radially-extending arm having an actuator coil mounted thereon, said first pivot point positioned with respect to a data disk so that said data head may be positioned over a data zone and a landing zone on said data disk by passing an electrical current through said actuator coil, a static bi-stable mechanical disk drive actuator latch comprising:

a latch member mounted at a second pivot point, said latch member rotatable between an open position defined by an opened-position stop and a closed position defined by a closed-position stop, said latch member including first and second arms radially extending from said pivot point, said first arm including a hook located proximate to a distal end thereof and having a first soft magnetic mass mounted thereon, said second arm including a latch coil and a second soft magnetic mass mounted thereon, and having a tang extending in a direction generally towards said actuator;

said second radially extending arm of said actuator including a protuberance extending in a direction generally towards said tang, and a tip nestable in said hook;

said first and second pivot points positioned with respect to one another such that said tang will contact said protuberance at a predetermined position when said actuator is rotating so as to place said data head over said landing zone and such that said contact will cause said latch member to rotate from said open position to said closed position and said tip will be captured by said hook when said actuator is positioned such that said data head is over said landing zone and said latch member is in said closed position; and a magnet positioned proximately to said actuator coil, said latch coil, and said first and second soft magnetic masses;

wherein the rotational position of said actuator may be controlled by passing an electric current through said actuator coil, said magnet has a field strength selected such that, said magnet is positioned such that, and said first and second soft magnetic masses are sized such that, a magnetic force of attraction between said magnet and said first soft magnetic mass will hold said latch member at said closed position, passing an electric release current through said latch coil will move said latch member to said open position, and a magnetic force of attraction between said magnet and said second soft magnetic mass will hold said latch member at said open position after said electric release current is turned off.

4. In a disk drive mechanism including an actuator mounted at a first pivot point, said actuator including a first radially-extending arm including a data head mounted thereon and a second radially-extending arm having an actuator coil mounted thereon, said first pivot point positioned with respect to a data disk so that said data head may be positioned over a data zone and a landing zone on said data disk, a static bi-stable mechanical disk drive actuator latch comprising:

a latch member mounted at a second pivot point, said latch member rotatable between an open position defined by an opened-position stop and a closed position defined by a closed-position stop, said latch member including first and second arms radially extending from said pivot point, said first arm including a hook located proximate to a distal end thereof and having a first soft magnetic mass mounted thereon, said second arm including a latch coil and a second soft magnetic mass mounted thereon, and having a tang extending in a direction generally towards said actuator;

said second radially extending arm of said actuator including a protuberance extending in a direction generally towards said tang, and a tip nestable in said hook;

said first and second pivot points positioned with respect to one another such that said tang will engage said protuberance at a predetermined position when said actuator is rotating so as to place said data head over said landing zone and such that said tip will be captured by said hook when said actuator is positioned such that said data head is over said landing zone and said latch member is in said closed position; and a magnet positioned proximately to said actuator coil, said latch coil, and said first and second soft magnetic masses;

wherein the rotational position of said actuator may be controlled by passing an electric current through said actuator coil, said magnet has a field strength selected such that, said magnet is positioned such that, and said first and second soft magnetic masses are sized such that, a magnetic force of attraction between said magnet and said first soft magnetic mass will hold said latch member at said closed position, passing an electric release current through said latch coil will move said latch member to said open position, and a magnetic force of attraction between said magnet and said second soft magnetic mass will hold said latch member at said open position after said electric release current is turned off.

5. In a disk drive mechanism including an actuator mounted at a first pivot point, said actuator including a first radially-extending arm including a data head mounted thereon and a second radially-extending arm having an actuator coil mounted thereon, said first pivot point positioned with respect to a data disk so that said data head may be positioned over a data zone and a landing zone on said data disk, a static bi-stable mechanical disk drive actuator latch comprising:

a latch member mounted at a second pivot point, said latch member rotatable between an open position defined by an opened-position stop and a closed position defined by a closed-position stop, said latch member including first and second arms radially extending from said pivot point, said first arm including a hook located proximate to a distal end thereof and having a first soft magnetic mass mounted thereon, said second arm including a latch coil and a second soft magnetic mass mounted thereon, and having a tang extending in a direction generally towards said actuator;

said second radially extending arm of said actuator including a protuberance extending in a direction generally towards said tang, and a tip nestable in said hook;

said first and second pivot points positioned with respect to one another such that said tang will engage said protuberance at a predetermined position to cause rotation of said latch member from said open position to said closed position when said actuator is rotating so as to place said data head over said landing zone and such that said tip will be captured by said hook when said actuator is positioned such that said data head is over said landing zone and said latch member is in said closed position; and a magnet positioned proximately to said actuator coil, said latch coil, and said first and second soft magnetic masses;

wherein said magnet has a magnetic field strength selected such that, said magnet is positioned such that, and said first and second soft magnetic masses are sized such that, a magnetic force of attraction between said magnet and said first soft magnetic mass will hold said latch member at said closed position, passing an electric release current through said latch coil will move said latch member to said open position, and a magnetic force of attraction between said magnet and said second soft magnetic mass will hold said latch member at said open position after said electric release current is turned off.

* * * * *